United States Patent [19]

Ulin

[11] 4,128,007
[45] Dec. 5, 1978

[54] SUPPORT MEMBER FOR A DISPOSABLE THERMOMETER

[75] Inventor: Roy A. Ulin, Wyckoff, N.J.

[73] Assignee: Akzona Incorporated, Asheville, N.C.

[21] Appl. No.: 869,406

[22] Filed: Jan. 16, 1978

[51] Int. Cl.² ............................................ G01K 11/12
[52] U.S. Cl. ................................... 73/352; 73/343 R; 73/356; 128/2 H
[58] Field of Search ..................... 73/356, 343 R, 352; 116/114 V, 114.5; 128/2 H

[56] References Cited

U.S. PATENT DOCUMENTS

| 3,430,491 | 3/1969 | Gignilliat | 73/356 |
| 3,871,232 | 3/1975 | Pickett | 73/356 |
| 4,054,057 | 10/1977 | Kluge | 73/343 |

Primary Examiner—S. Clement Swisher
Attorney, Agent, or Firm—Francis W. Young; David M. Carter

[57] ABSTRACT

There is provided an adapter for use with and attachment to a disposable thermometer. The adapter is an elongated substantially rigid member having an open window in one end thereof. A means is provided for retaining the disposable thermometer to the member. The thermally-responsive portion of the thermometer is in alignment with the window for providing improved thermal response for the thermally-responsive portion of the thermometer when used with the adapter. The adapter is made especially for use with the thermometer in rectal temperature applications.

13 Claims, 8 Drawing Figures

SUPPORT MEMBER FOR A DISPOSABLE THERMOMETER

BACKGROUND OF THE INVENTION

This invention relates to adapters for use with disposable thermometers. More particularly, it relates to adapters attached to disposable thermometers having improved thermal conductivity to the thermometer especially useful in rectal applications.

Disposable thermometers have been provided for use in human oral temperature taking and some of which have been shown to be just as accurate as mercury and glass thermometers. Examples of one type of disposable thermometer useful herein are disclosed in U.S. Pat. Nos. 3,677,088 and Des. 233,472, assigned to Bio-Medical Sciences, Inc., and are hereby incorporated by reference. These disposable thermometers utilize a plurality of pockets embossed in an aluminum carrier. Each pocket contains a chemical which will progressively melt at a certain predetermined temperature usually 0.2° C apart. A clear material is normally laminated over the aluminum carrier. One such disposable thermometer is shown in FIGS. 1 and 2. As stated previously, these disposable thermometers were made generally for oral temperature taking. The aluminum carrier is made of a very thin material. The thermometer was not very rigid and because of this thinness and lack of rigidity, it was not suited for rectal temperature taking. In order to overcome these problems, rectal adapters have been designed. An example of a prior art rectal adapter is shown in FIG. 3.

Rectal adapter 3 includes grooved out portion 4 for receiving disposable thermometer 1. Handle 7 of the disposable thermometer was fitted into handle receiving portion 8 of the rectal adapter. The rectal adapter was made of polypropylene material and was of sufficient thickness and rigidity to provide comfort during rectal use. It has been found, however, by experimentation that disposable thermometers used with the prior art rectal adapter are not as accurate as glass and mercury thermometers. Because of the insulation to isolation effects of prior art rectal adapters, disposable thermometers, utilizing the adapter as shown in FIG. 3, quite often registered lower temperatures than mercury and glass thermometers, and furthermore, sometimes there was no registration at all. Also sometimes some of the indicator dots were skipped in their firing sequence because of their insulation and isolation.

OBJECTS OF THE INVENTION

It is one object of this invention to provide an improved adapter for use with a disposable thermometer.

It is another object to provide an adapter for use with a disposable thermometer having improved thermal transfer characteristics.

It is another object to provide an adapter for a disposable thermometer having improved thermal transfer characteristics and ease of reading.

It is another object to provide an adapter for use with a thin disposable thermometer having sufficient rigidity and thickness for comfort as well as providing means for improved accuracy of the thermometer.

It is another object of this invention to provide a rectal adapter for use with the disposable thermometer having a means for preventing low readings and dot misfires so as to make the thermometer a useful device in rectal application.

SUMMARY OF THE INVENTION

In accordance with one form of this invention there is provided an adapter for use with and attachment to a disposable thermometer. The adapter includes an elongated substantially rigid member. The member has a forward section and a rearward section. The member further has a means for retaining a disposable thermometer thereto. The forward section has an opening therethrough for providing improved thermal conductivity to the thermometer.

DESCRIPTION OF THE PREFERRED EMBODIMENTS

Figure 1:
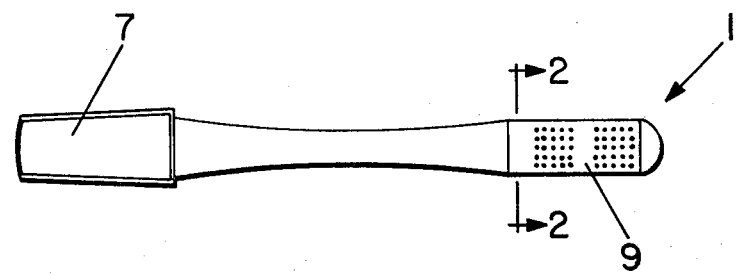
FIG. 1 is a top plan view of a disposable thermometer which may be used with the adapter of the present invention.
Figure 2:
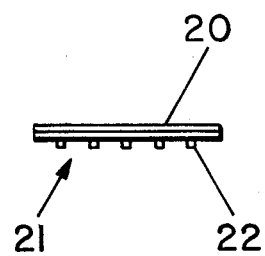
FIG. 2 is a sectional view of the disposable thermometer shown in FIG. 1 taken along lines 2—2.
Figure 4:
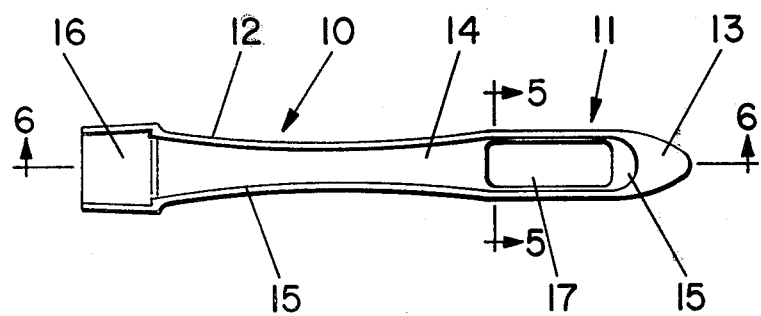
FIG. 4 is a top plan view of an adapter showing some of the features of this invention.
Figure 5:
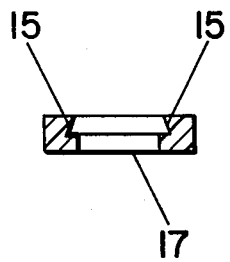
FIG. 5 is a sectional view of the adapter shown in FIG. 4 taken along lines 5—5.
Figure 6:
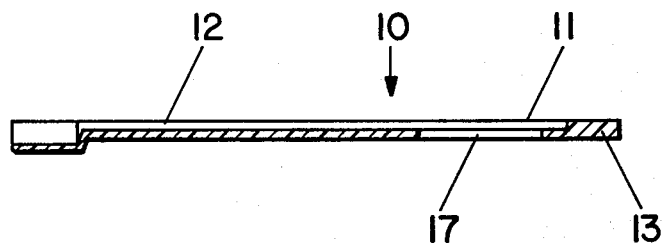
FIG. 6 is a sectional view of the adapter shown in FIG. 4 taken along lines 6—6.

Referring now to FIG. 4, there is provided rectal adapter 10 for use with disposable thermometer 1 shown in FIG. 1. Rectal adapter 10 is an elongated monolithic member having sufficient rigidity for holding disposable thermometer 1 in place during human rectal insertion. In this embodiment, the adapter is made of polypropylene, however, other suitable materials, such as other plastics, may be used. As stated previously, disposable thermometer 1 is a thin (approximately 1mm thickness) elongated aluminum sheet. Rectal adapter 10 further provides sufficient 1 (approximately 1 cm in this embodiment) to alleviate the problem of cutting during rectal insertion of thermometer 1.

Referring again to FIG. 4, rectal adapter 10 includes forward section 11 and rearward section 12. Forward section 11 includes substantially solid tip 13 which is the leading edge of the rectal adapter during insertion into the rectum. Tip 13 is a partially flattened conical shape for comfort during insertion. The inside bottom portion 14 of the rectal adapter receives the bottom portion 22 of thermometer 1. The thermometer 1 is adapted to be snap-fitted into the adapter by means of lip 15 which extends about a portion of the periphery of the adapter. As can be seen, lip 15 extends outwardly from the bottom surface 14 of the adapter and inwardly towards its longitudinal axis. The rearward portion 12 of the adapter further includes a handle receiving portion 16 for receiving handle 7 of the thermometer. Other embodiments of disposable thermometers do not utilize a handle and thus handle receiving portion 16 would act as a handle itself or could be eliminated.

Again referring to FIG. 4, the forward section 11 of the adapter further includes an open window portion 17 which is adapted to align with thermally-responsive temperature indicating portion 9 of thermometer 1. This window 17 is in effect a hole punched through the adapter for providing improved thermal contact for temperature indicating portion of the thermometer and its immediate environment. This may be better seen in reference to FIGS. 7 and 8.

Figure 7:
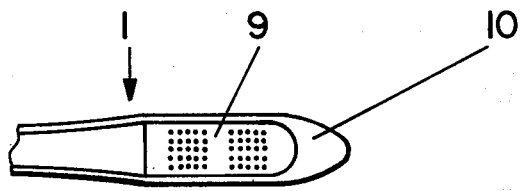
FIG. 7 is a partial top plan view of the adapter shown in FIG. 4 with a disposable thermometer attached thereto.

FIG. 7 shows thermometer 1 snap-fitted into rectal adapter 10 with the top side of the indicating portion 9 facing outward and covering the open window 17 shown in FIG. 4.

Figure 3:
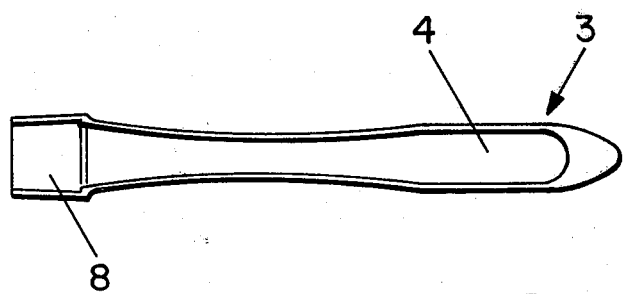
FIG. 3 is a top plan view of a prior art rectal adapter.
Figure 8:
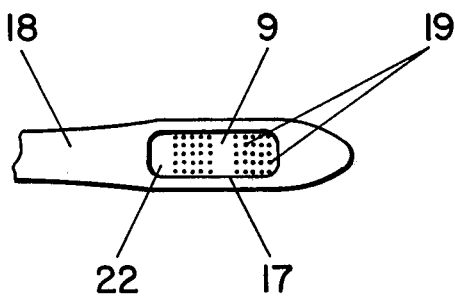
FIG. 8 is a partial bottom plan view of the adapter/thermometer combination of FIG. 7.

FIG. 8 shows the bottom side 18 of rectal adapter 10 with the bottom side 21, in this embodiment, of the temperature indicating portion of thermometer 1 exposing pockets 22 directly to its surrounding environment through window 17. The use of thermometer 1 in combination with prior art rectal adapter 3 shown in FIG. 3 did not permit the bottom side of the thermometer thermally-responsive material to be exposed to the environment. That is, the pockets 19 rested against the polypropylene material on the inside bottom layer 4 of the prior art rectal adapter. Since the rectal adapter 3 was normally made of a plastic, such as polypropylene, and since these plastic materials are thermal insulators, it was found that the thermometer, when used with the prior art rectal adapter, registered lower than a mercury and glass thermometer. Furthermore, clinical studies have shown that the use of the disposable thermometer with the prior art rectal adapter caused no fires, that is, some of the dots between the highest temperature dot fired and some lower temperature dots did not even register, thus providing a confused reading to the observer. Furthermore, if the indicating portion of the thermometer was inserted face down into the prior art adapter, the thermometer could be read only by removing it from the adapter. Exposing both sides 20 and 21 of the thermally-responsive portion of the disposable thermometer to its immediate environment by providing an open window in the rectal adapter thermally-responsive portion of the thermometer has greatly improved the accuracy and response time of the thermometer. It has been shown by experiment that rectal temperatures taken using the improved rectal adapter/disposable thermometer combination provides the same temperature readings as a 3-minute glass and mercury thermometer reading. The disposable thermometer, however, provided the reading within 1-½ to 2 minutes. Furthermore, experiments showed no tendency for the disposable thermometer to register "no fires", or skips, as did the thermometer used with a prior art rectal adapter. Because of the window, the thermometer may be easily read without removing it from the rectal adapter even if the thermometer has its indicating portion face down in the adapter. Thus, the window in the improved rectal adapter provides a dual function of improved thermal transfer characteristics and ease of reading for the thermometer.

As stated previously, one of the problems with the prior art adapter is incorrect low thermometer readings due to the fact that the adapter may be made of plastics insulators with the thermal conductivities listed below:
polypropylene 2.8 × $10^{-4}$ cal-cm/sec/cm$^2$/°C
polyethylene 8–12 × $10^{-4}$ cal-cm/sec/cm$^2$/°C
polyvinylchloride 3–4 × $10^{-4}$ cal-cm/sec/cm$^2$/°C
polycarbonate 4.6 × $10^{-4}$ cal-cm/sec/cm$^2$/°C
polystyrene 1–3 × $10^{-4}$ cal-cm/sec/cm$^2$/°C Thus an operable adapter utilizing applicant's invention may be made from the same or similar materials enabling correct thermometer readings.

From the foregoing description of the preferred embodiments of the invention, it would be apparent that many modifications may be made therein. For example, the thermometer 1 may be placed into the adapter with either the pockets 22 facing up or down. It is therefore intended that such modifications shall be covered by the appended claims.

What is claimed is:

1. An adapter for use with an attachment to a disposable thermometer comprising:
    an elongated substantially rigid member;
    said member having a forward section and a rearward section;
    said member further having means to retain a disposable thermometer thereto;
    said forward section having an opening therethrough for providing improved thermal conductivity to the thermometer.

2. An adapter as set forth in claim 1 wherein said member further having a top side and a bottom side; said means to retain connected to said top side; said opening being through said top and bottom sides.

3. An adapter as set forth in claim 1 wherein the thermometer has a thermal sensitive portion adapted to be placed contiguous to said opening.

4. An adapter as set forth in claim 2 wherein said means to retain include a lip portion extending upwardly from a portion of the periphery of said member; said lip portion further extending inwardly toward the longitudinal axis of said member.

5. An adapter as set forth in claim 1 wherein said member is sufficiently rigid to support a disposable thermometer and sufficiently thick for relative comfort during rectal insertion.

6. An adapter as set forth in claim 1 wherein said member is made of a thermal insulating material a thermal conductivity in the range of from $1 \times 10^{-4}$ to $12 \times 10^{-4}$ cal-cm/sec/cm$^2$/°C.

7. An adapter as set forth in claim 6 wherein said member is made of polypropylene.

8. An adapter as set forth in claim 1 wherein said member is made of a plastic material.

9. The combination of a thin elongated disposable thermometer having thermally-responsive material located at one end thereof and a substantially rigid adapter for supporting said thermometer especially for rectal application, the improvement comprising:
    an open window located at one end of said adapter;
        said window being aligned with said thermally-responsive material for providing fast and accurate indication of the temperature contiguous to said window.

10. The combination as set forth in claim 9 further including means to retain said thermometer to said adapter.

11. The combination as set forth in claim 9 wherein said one end of said thermometer being a thin member having two substantially flat faces, said thermally-responsive material located between said faces; neither of said two faces being thermally insulated by said adapter.

12. A rectal adapter for use with a very thin substantially non-rigid disposable thermometer having at least two laminates with temperature indicating material located at one end and between the two laminates comprising:
    a substantially rigid elongated member having a similar planar shape to said disposable thermometer;

said member being substantially thicker than said thermometer;

means for attaching said thermometer to said member;

an open window adapter one end of said member for receiving the portion of said thermometer having temperature indicating material, whereby said portion of said thermometer having temperature indicating material is directly exposed to the surrounding environment through said open window.

13. A rectal adapted set forth in claim 12 wherein said member is made of a thermally insulating plastic material.

* * * * *